Figure 1:
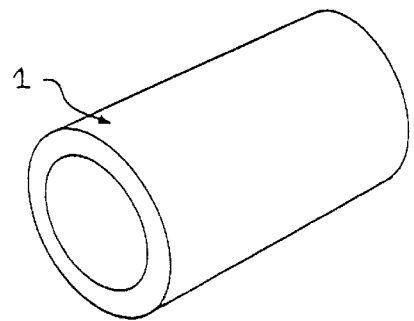

United States Patent [19]
Quinney

[11] Patent Number: 5,966,807
[45] Date of Patent: Oct. 19, 1999

[54] MANUFACTURING PISTON RINGS

[76] Inventor: Martin James Quinney, 30 Laurel Drive, Newport, Shropshire TF10 7LY, United Kingdom

[21] Appl. No.: 09/011,552

[22] PCT Filed: Aug. 5, 1996

[86] PCT No.: PCT/GB96/01899

§ 371 Date: May 26, 1998

§ 102(e) Date: May 26, 1998

[87] PCT Pub. No.: WO97/05985

PCT Pub. Date: Feb. 20, 1997

[30] Foreign Application Priority Data

Aug. 8, 1995 [GB] United Kingdom .................. 9516240

[51] Int. Cl.$^6$ .................................................. B23P 15/06
[52] U.S. Cl. .............................. 29/888.074; 29/888.072; 29/888.075; 29/888.076
[58] Field of Search ................. 29/888.072, 888.074, 29/888.075, 888.076, 557; 277/909, 910, 310

[56] References Cited

U.S. PATENT DOCUMENTS

| | | | |
|---|---|---|---|
| 1,050,102 | 1/1913 | Campbell | 29/888.072 |
| 1,439,017 | 12/1922 | Narsh | 29/888.075 |
| 2,377,960 | 6/1945 | Phillips | 29/888.06 |
| 2,846,379 | 8/1958 | Chambers et al. | 29/888.074 |
| 4,463,487 | 8/1984 | Raggi . | |
| 4,651,395 | 3/1987 | Tanner et al. | 29/888.074 |
| 4,713,867 | 12/1987 | Fox | 29/888.075 |
| 4,758,005 | 7/1988 | Fox | 29/888.075 |

FOREIGN PATENT DOCUMENTS 0 436 996 A1  12/1990  European Pat. Off. .

*Primary Examiner*—Irene Cuda
*Attorney, Agent, or Firm*—Renner, Otto, Boisselle & Sklar, P.L.L.

[57] ABSTRACT

A method of manufacturing piston rings from a tube blank includes cutting a longitudinal slot in the tube blank, applying a force to the tube blank so that the slot is at least partially closed and the tube has a stressed shape, securing the stressed tube such taht the tube remains in the stressed shape upon removal of the force, laterally slicing the stressed tube to form a plurality of individual stressed shape piston rings, and releasing each of the individual stressed shape piston rings such that each of the piston rings returns to its unstressed shape.

36 Claims, 3 Drawing Sheets

MANUFACTURING PISTON RINGS

This invention relates to manufacturing piston rings.

Piston rings are currently produced using one of two established methods.

The first method comprises "parting off" a cast tube into individual sections to form piston ring blanks from which piston rings are produced. The second method comprises casting the individual piston ring blanks to near nett shape using the principle of investment casting.

EP-A-0,436,996 discloses a method similar to that of the above mentioned first method, in which a tube is cast, machined and then parted into a plurality of piston rings which are then individually gapped.

An alternative method is disclosed in U.S. Pat. No. 4,713,867 wherein a plurality of individual rings are gapped, compressed, resealed and then assembled in a suitable device whereupon the individual rings are collectively machined.

Certain functional properties of piston rings such as their "diametric load" and "free shape" properties currently require them to be produced from individual blanks to the exclusion of other currently available and cost effective manufacturing techniques.

The main disadvantage of processing the above blanks arises from the need to handle them individually, or in small groups, for a majority of operations. Handling times significantly contribute to the total floor-to-floor time of each batch. Also, in general, many handling activities require a high level of diligence and certain acquired skills which, when relaxed or ignored, can lead to the manufacture of a non-conforming product.

Another disadvantage relates to the total setting and transportation times associated with blank processing and the sequential steps thereof. Discrete machining operations are almost always performed on operation-specific machines, and if a small to medium sized batch is to be processed, a considerable proportion of the total lead time will be spent in setting up the job and preparing it for transportation. This can affect the product delivery dates and profit margins.

Other drawbacks also exist. Numerous machines are required to perform the various machining operations and these in general require relatively high manning levels. Moreover, much of the plant has to be dedicated to specific tasks associated with piston ring production, making it expensive to maintain whilst reducing its potential for flexible manufacture. Furthermore, the planning, scheduling and progressing of work is difficult and time consuming whilst associated control and administration functions require high levels of staffing, thereby significantly contributing toward indirect costs.

The present method seeks to improve manufacturing efficiency, by eliminating, or at least reducing, the disadvantages listed above. In particular, the present method seeks to increase the opportunity for automation of the manufacturing process and to enable large numbers of piston rings to be manufactured on a continuous or small batch production line basis, if required.

In accordance with the present invention, therefore, there is provided a method of manufacturing piston rings from a tube blank, the method comprising the steps of:

A. cutting a longitudinal slot in said tube blank;

B. applying a force to said tube blank such that said slot is at least partially closed and said tube adopts a stressed shape;

C. securing said stressed tube such that said tube retains its stressed shape upon removal of said force;

D. laterally slicing said stressed tube to form a plurality of individual stressed shape piston rings;

E. releasing each of said individual stressed shape piston rings such that each of said piston rings returns to its unstressed shape.

In one embodiment, the method further comprises the step of:

C1. forming a plurality of ring features on internal and/or external faces of said stressed tube.

The skilled man will appreciate that the term "stressed shape" refers to the shape adopted by the slotted tube blank when the force of step (B) is applied to at least partially close the slot. Similarly, the "unstressed shape" refers to the shape of the slotted tube blank when that force has been removed.

As will be further elaborated hereinafter, the present method exhibits a number of advantages over the prior art. In particular, the production and machining of a tube blank is significantly easier than the production and machining of a plurality of individual piston rings. The prior art methods necessitated expensive and time consuming quality control systems to ensure the consistency of the final product. The present method, however, significantly reduces such costs by enabling the manufacture of a plurality of substantially identical piston rings. In addition, the fact that the present method involves the machining of a closed stressed tube simplifies the entire process as the prior art method of machining or introducing features in individual piston rings would prove difficult to achieve on a regularly consistent basis.

In one embodiment, coated piston rings can be produced by firstly coating a pre-stressed tube which has been machined with the appropriate ring features, and secondly separating individual rings from the coated tube.

Separation of substantially formed plain piston rings from the pre-stressed tube may occur at any stage following their formation, either singularly or in multiples.

In one embodiment of the method, separation of the individual piston rings from the stressed tube occurs immediately after the stressed tube has been machined to a desired finished cross-sectional shape.

The bonding agent (which still holds the ring closed) is removed following separation thereby allowing the ring to "open up" and in so doing, assume its natural free shape.

In accordance with other embodiments, the invention may be used for the production of plain rings which are without an external coating as well as for those with, for example, electroplated rings, plasma and wire sprayed rings, rings coated by way of physical vapour deposition, ceramic coated rings and phosphate coated rings.

Preferably, in the case of an externally coated, stressed tube, separation will usually occur after the coated stressed tube has been machined, usually by way of grinding, to a specific size and shape, the size and shape corresponding to that required of the final ring. The advantages of coating a stressed tube are many. For one, electroplated tubes may have a chemically inert non-conductive retinoid or similar coating applied to their outer surface so that features intended for electroplating can be machined through the said coating into the substrate of the tube exposing this area only to a chromium plating process, for example. Consequently, chromium consumption will be reduced along with the associated plating time and the time required to grind the tubes' plated exterior. Embodiments of the present method can also eliminate or reduce the possibility of gasses disrupting the uniformity of the coating as a consequence of poorly scaled ring gaps. Furthermore, the present technique may improve galvanic conductivity by reducing the number of piston ring interfaces, hence resistivity, leading to significant power savings.

Coated rings will also benefit from the invention ban virtue of reduced handling and the rationalization of tooling, particularly through the elimination of certain stacking and loading procedures, along with associated cage conformance checks.

Embodiments of the present method can also dispense with elaborate control measures such as those invoked by concentricity conformance requirements. This applies to a majority of ring features be they coated or otherwise since their concentricity and accuracy, both geometric and dimensional, should be sufficient to eliminate certain quality checks whilst simplifying the remainder, for example using touch trigger probing.

A significant advantage of embodiments of the new method with regard to both plain and coated rings, is its potential to greatly reduce the total lead time by allowing a large number of ring features to be machined on a tube without having to separate the substantially formed rings until the full compliment have been so machined. Consequently, a new batch of plain rings need only require a stressed tube to be set up and handled once while coated rings (which previously generally require upward of thirty separate operations) may only require the stressed tube to be set-up twice and handled perhaps five or six times, constituting a substantial saving in total lead time.

Preferably, the method is made even more cost effective by casting or heat forming tubes in an elliptical shape, so that a tube which has been longitudinally slotted along its minor axis will close rounder than if it were to be slotted having been cast round, thereby reducing material losses during the machining process.

Above all, this method has been designed with Computer Numerically Controlled (CNC) machining in mined. The repeatability and accuracy of CNC machining, along with other acknowledged advantages of this technology such as "ease of setting" can be fully harnessed when used for processing stressed tubes and because they can be concentrically processed, conventional CNC technology may be used. Hence, this method can be put to maximum effect when used in conjunction with current CNC technology.

Figure 2:
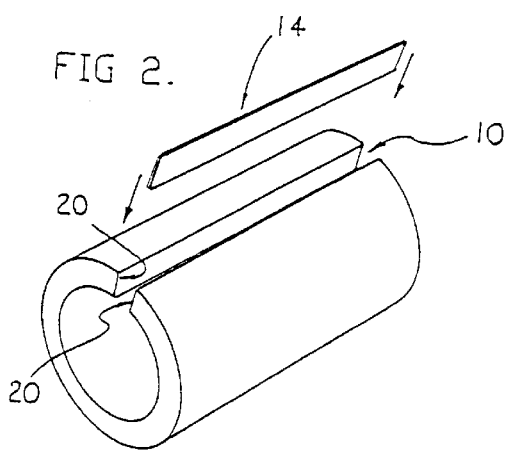
Figure 3:
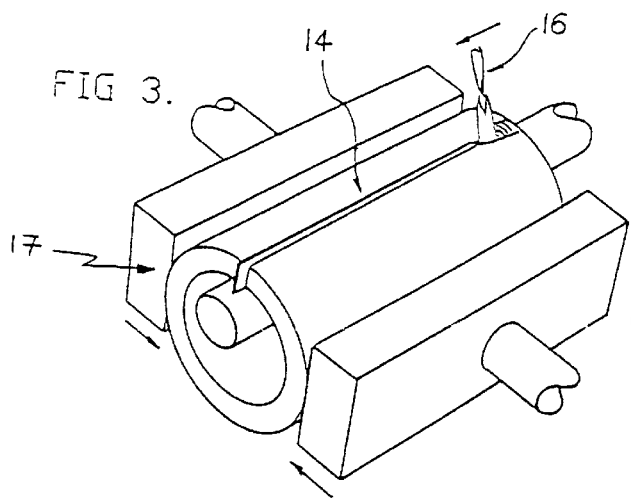
Figure 4:
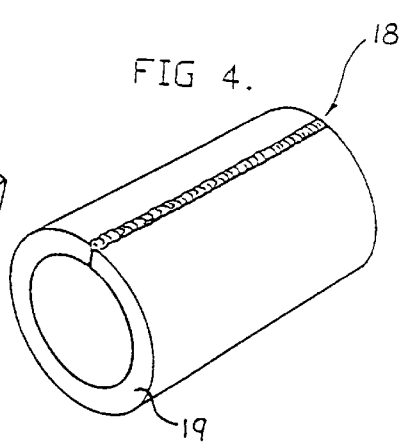
Figure 5:
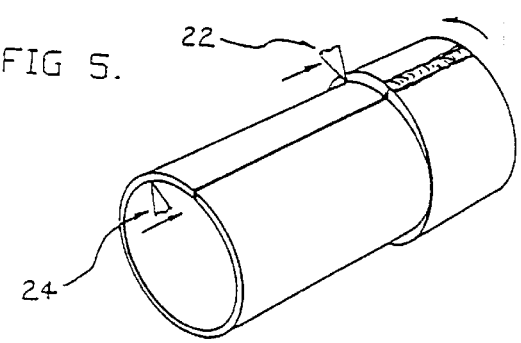
Figure 6:
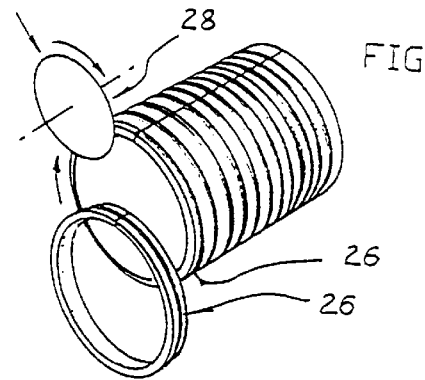
Figure 7:
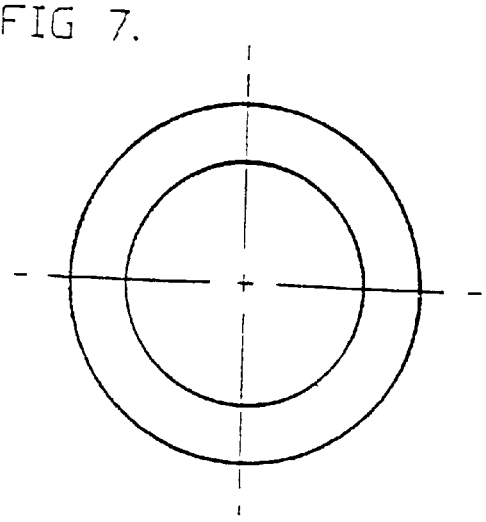
Figure 8:
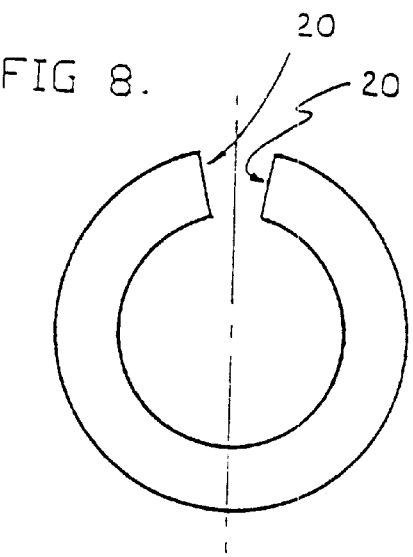
Figure 9:
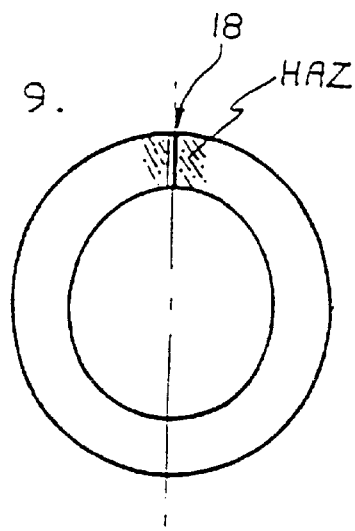
Figure 10:
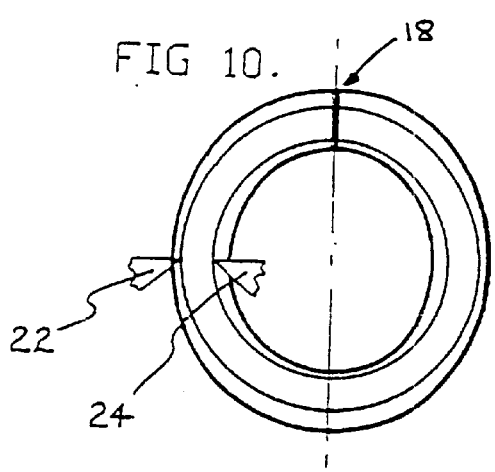
Figure 11:
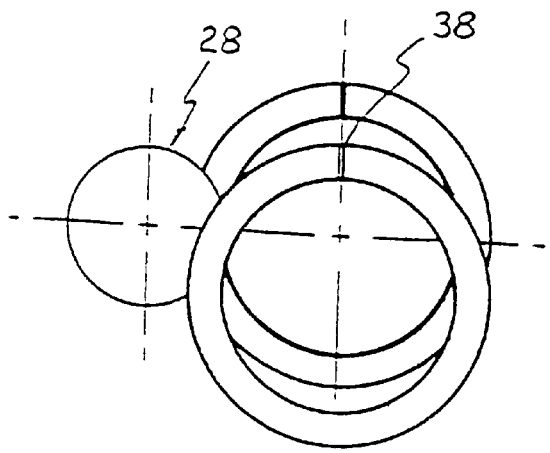
Figure 12:
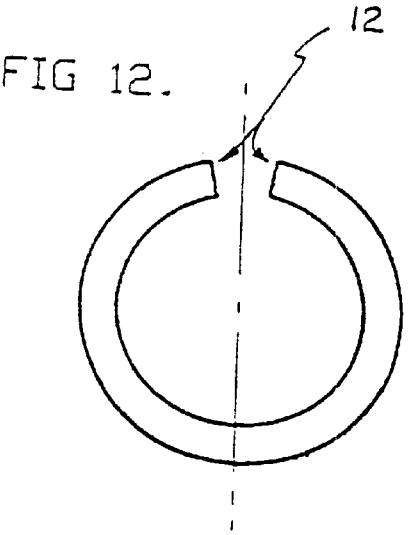
Figure 13:
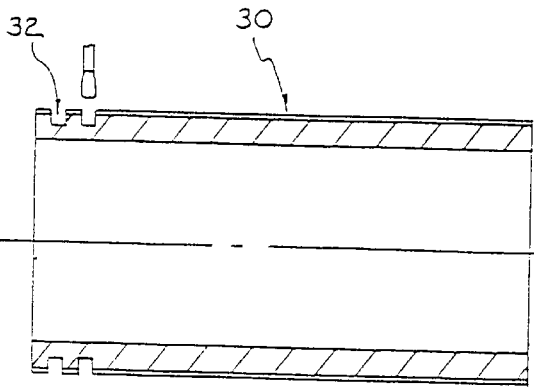
Figure 13:
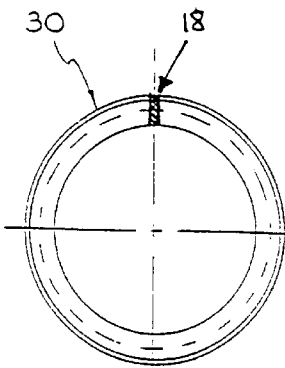
Figure 14:
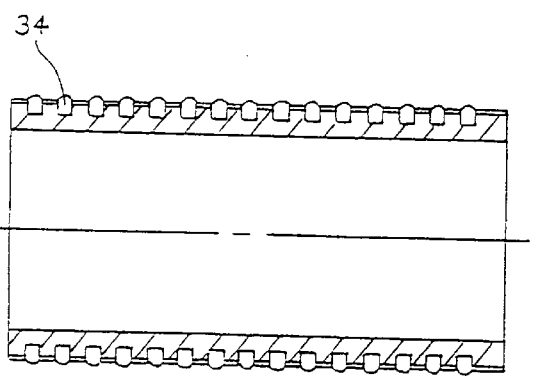
Figure 14:
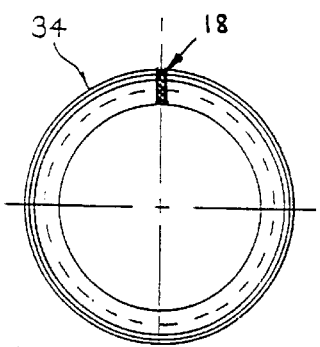
Figure 15:
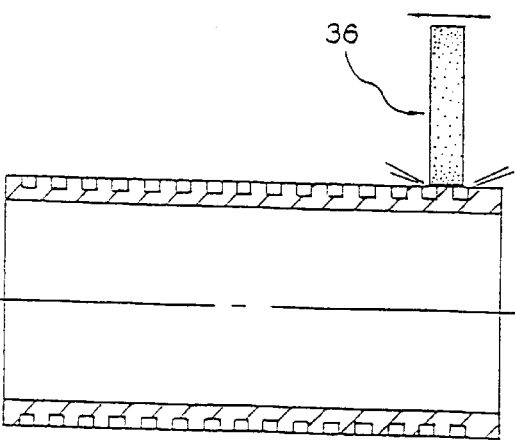
Figure 15:
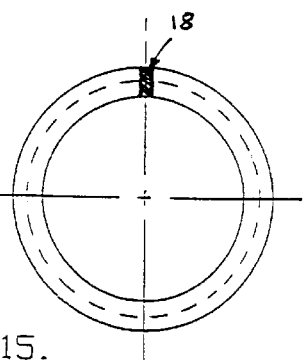

The present invention will now be described by way of example only and with reference to the accompanying drawings, throughout which like parts are referred to by like references, and in which:

FIG. 1 schematically shows a perspective view of a cast iron tube;

FIG. 2 schematically shows a perspective view of the tube after it has been longitudinally slotted;

FIG. 3 schematically shows a perspective view of a closed tube enclosing a brass strip which is in the process of being melted;

FIG. 4 schematically shows a perspective view of a pre-stressed tube;

FIG. 5 schematically shows a perspective view of a pre-stressed tube being concentrically turned and bored;

FIG. 6 schematically shows a perspective view of a pre-stressed tube with substantially formed ring shapes and a substantially formed ring separated using a flexible grinding wheel;

FIG. 7 schematically shows an end view of a cast iron tube;

FIG. 8 schematically shows an end view of a slotted tube;

FIG. 9 schematically shows an end view of a pre-stressed tube;

FIG. 10 schematically shows an end view of a pre-stressed tube being concentrically turned and bored;

FIG. 11 schematically shows an end view of a substantially formed ring being separated from the pre-stressed tube;

FIG. 12 schematically shows an end view of a free shape ring with the brass filler melted from its joint;

FIG. 13 schematically shows a radial view and an axial cross-sectional view of a pre-stressed tube covered with a layer of resin;

FIG. 14 schematically shows a radial view and an axial cross-sectional view of a pre-stressed tube with a series of chromium filled grooves; and FIG. 15 schematically shows a radial view and an axial cross-sectional view of a pre-stressed tube undergoing cylindrical grinding.

With reference to the appended drawings, FIGS. 1 to 6 illustrate a first embodiment of the present invention, FIGS. 7 to 11 illustrate complementary end views of the first embodiment and FIGS. 13 to 15 illustrate a second embodiment of the present invention.

FIG. 1 shows an iron tube 1 that has preferably been formed by centrifugal casting, although other methods of casting or manufacture are equally suitable. Similarly, materials other than iron may be utilised for the tube 1. The iron tube 1 is longitudinally slit by suitable means to form a longitudinal slot 10. The size of the slot 10 corresponds closely with the size of an "open gap" 12 in a finished piston ring.

As illustrated in FIG. 2, a brass strip 14, which may be similar in width to a finished ring's "closed gap" clearance, is then inserted within the longitudinal slot 10 so as to be in close proximity to the tube's slot interfaces 20. The strip 14 is coated with a suitable flux prior to its insertion within the slot 10, which enables the strip 14 to be bonded to the interfaces 20 of the slot 10 upon the application of a suitable heat source to the slot 10 and embedded strip 14. It is conceivable that the strip may be manufactured from materials other than brass, although a strip manufactured from brass is highly preferable.

FIG. 3 illustrates the next step in the present technique. The slotted tube 1 with the brass strip 14 embedded therein is placed within a vice 17. The vice 17 enables force, preferably in the form of diametric inward pressure, to be applied to the slotted tube 1. Upon the application of such force by the vice 17, the tube's interfaces 20 are brought into abutment and the brass strip 14 is trapped therebetween. An oxy-acetylene torch 16 is then utilised to provide heat to the tube 1 and embedded strip 14 in accordance with normal brazing procedures. The heat from the torch 16 causes the flux to melt and bonds the brass strip 14 to the slotted tube's interfaces 20.

Other methods and materials for bonding the slot interfaces to each other may alternatively be employed. For example, the slot interfaces could be resistance welded, induction welded or electron beam welded, together and then opened again at a later stage by a suitable cutting device such as a carbide cutter or a grinding wheel. Alternatively, a powerful adhesive could be used to bond the slot interfaces, the adhesive being removable at a later stage by a suitable solvent.

The oxy-acetylene torch 16 is highly preferable as a heat source as it enables the heat applied to the tube 1 to be localised to as small an area as practically possible. In this way, the tube's heat affected zone (HAZ) is minimised. However, other heat sources or heat generation methods, such as ultrasonic welding or arc welding, may equally well be employed.

FIG. 4 illustrates a pre-stressed tube 19 which has been removed from the vice 17 after utilisation of the oxy-acetylene torch 16 to bond the brass strip 14 within the slot 10. The stressed tube 19 has an approximately elliptical shape in cross-section and is secured by a filler agent 18 comprising the heat treated brass strip 14 and flux. The stressed tube is now ready for machining into any desired shape or configuration (in an alternative embodiment the tube blank has a substantially elliptical cross-section, in which case the stressed tube would have a substantially circular cross-section. Other cross-sectional shapes for the stressed and unstressed tube are also conceivable-depending on the piston ring's desired final shape).

As illustrated in FIG. 5, the stressed tube 19 may be concentrically turned 22 and/or concentrically bored 24 to diametric sizes which, depending on any subsequent machining operations, correspond either precisely or very closely to the diametric sizes of the finished closed gap piston ring. A full complement of piston rings may then be formed by introducing appropriate ring features 26 into internal and/or external faces of the pre-stressed tube 19.

As illustrated in FIG. 6, each feature 26 or set of features relating to individual piston rings have been sufficiently spaced so as to allow for separation of those rings with a high speed flexible grinding wheel 28.

The above steps will now be reviewed with reference to FIGS. 7 to 12, which illustrate the tube 1 in end view.

FIG. 7 shows an end view of the iron tube 1 prior to any machining operation. FIG. 8 shows the iron tube once a longitudinal slot has been cut in it and FIG. 9 illustrates an iron tube that has been stressed and brazed so that it has an elliptical cross-section. FIG. 10 illustrates a stressed tube 19 that has been both turned and bored until it is of the correct size and shape for the application for which it is required. FIG. 11 illustrates the slicing of the iron tube into individual piston rings with a high speed flexible grinding wheel. FIG. 12 illustrates an unstressed piston ring after it has been side face ground and longitudinally slit, such that the filler agent is removed using a rotary cutter with a cut marginally wider than the closed gap width of the stressed tube.

Alternatively, once the stressed tube 19 has been sliced into a plurality of individual piston rings, each individual piston ring may be subjected to heat in the vicinity of its ring joint 38. The filler agent 18, i.e. the brass strip 14 and flux, melts under action of heat and the piston ring springs apart by virtue of its internal stresses. Once again, the heat affected zone (HAZ) is kept to as localised an area as is practically possible. When melted, the filler agent 18 or 40 can be collected and recycled.

If the latter filler removal method is used, it is preferred that the entire ring is heat treated within an inert atmosphere to return the ring to its unstressed shape. This may then be normally followed by side face grinding of the ring to meet specified width tolerances and surface finish requirements.

FIGS. 13 to 15 illustrate a second embodiment of the present technique. This embodiment of the technique is particularly utilised when it is required to produce a coated piston ring.

FIG. 13 shows a stressed iron tube identical to that illustrated in FIGS. 4 and 9. The pre-stressed tube 19 has been coated with an outer layer 30. In this case, the outer layer is a resin layer, but any type of material that is impervious to an electroplating process could alternatively be utilised.

A series of grooves 32 are then machined into the tube 19 such that the grooves pass through the outer layer 30 and into the tube 19. The tube is then electrochemically plated so that chromium, or another desired secondary material, is deposited into the grooves 30. Of course, other deposition methods (such as plasma spraying, wire spraying or physical vapour deposition etc.) may be used to deposit alternative secondary materials (such as a ceramic or phosphate compound, amongst others).

FIG. 14 illustrates a tube 19 that has been so treated and it is apparent that the chromium has been selectively deposited in the grooves without being deposited on the resin layer 30 so that a series of chromium filled grooves 34 have been formed on the periphery of the tube 19.

The tube 19 is then further machined by the action of a cylindrical grinder 36, or other machining tools, so that the outer resin layer 30 and any excess chromium is removed. The tube 19 with its chromium filled grooves 34 may be profile ground if required, as illustrated in FIG. 15.

Once this stage has been completed, the tube 19 may be cut into individual chromium filled piston rings in a manner identical to that illustrated in FIGS. 6 and 11. In a similar manner to the first embodiment and to FIG. 12, the individual chromium filled piston rings may then be longitudinally slit so that the ring joint filler agent is removed and the piston ring springs apart to assume its natural unstressed shape.

It will be understood, of course, that the present invention has been described above by wax of example only and that modifications may be made within the scope of the appended claims.

For example, it should be noted that the present invention is not to be limited to a particular set of materials and that many different types of materials may be employed to give the same effect. Similarly, alternative coating methods and alternative cutting devices may be employed without prejudice to the scope of the hereinabove described invention.

Furthermore, although pistons for motor vehicles are generally of circular cross-section, this method may equally well be applied to the manufacture of piston rings for pistons of oval cross-section, or indeed any other shape for that matter.

I claim:

1. A method of manufacturing piston rings from a tube blank, the method comprising of steps of:
   A. cutting a longitudinal slot in said tube blank;
   B. applying a force to said tube blank such that said slot is at least partially closed and said tube adopts a stressed shape;
   C. securing said stressed tube such that said tube retains its stressed shape upon removal of said force;
   D. laterally slicing said stressed tube to form a plurality of individual stressed shape piston rings;
   E. releasing each of said individual stressed shape piston rings such that each of said piston rings returns to its unstressed shape.

2. A method according to claim 1 further comprising; after step C and prior to step D; the step of:
   C1. forming a plurality of ring features on internal and/or external faces of said stressed tube.

3. A method according to claim 2 further comprising; after step C and prior to step D; the steps of:
   C2. applying an outer coating to said stressed tube;
   C3. cutting grooves in said stressed tube, such that said grooves pass through said outer coating and into stressed tube;
   C4. treating said stressed tube such that said outer coating and grooves are covered with secondary material.

4. A method according to claim 3, wherein said outer coating is impermeable.

5. A method according to claim 3, wherein said outer coating is a resinous material.

6. A method according to claim 3, further comprising the step of:

C5. machining said stressed tube such that said outer coating and excess secondary material are removed.

7. A method according to claim 3, wherein said secondary material is coated by way of an electroplating process.

8. A method according to claim 7, wherein said secondary material is chromium.

9. A method according to claim 3, wherein said secondary material is coated by way of a plasma spraying process.

10. A method according to claim 3, wherein said secondary material is coated by way of a wire spraying process.

11. A method according to claim 3, wherein said secondary material is coated by way of a physical vapour deposition process.

12. A method according to claim 3, wherein said secondary material is a ceramic.

13. A method according to claim 3, wherein said secondary material is a compound of phosphorous.

14. A method according to claim 2 further comprising; after step C and prior to step D; the steps of:

C2. cutting grooves in said stressed tube;

C3. treating said stressed tub such that said grooves are covered with secondary material.

15. A method according to claim 14, wherein said secondary material is coated by way of an electroplating process.

16. A method according to claim 15, wherein said secondary material is chromium.

17. A method according to claim 14, wherein said secondary material is coated by way of a plasma spraying process.

18. A method according to claim 14, wherein said secondary material is coated by way of a wire spraying process.

19. A method according to claim 14, wherein said secondary material is coated by way of a physical vapour deposition process.

20. A method according to claim 14, wherein said secondary material is a ceramic.

21. A method according to claim 14, wherein said secondary material is a compound of phosphorous.

22. A method according to claim 1, further comprising the step of:

A1. inserting a filler agent into said slot, and wherein step C further comprises the step of treating said filler agent such that said filler agent bonds to said slot and retains said stressed shape after removal of said force.

23. A method according to claim 22, further comprising the step of:

F. recovering said filler agent and recycling at least a part thereof.

24. A method according to claim 22, wherein said treating step is accomplished with an oxy-acetylene torch.

25. A method according to claim 22, wherein said treating step is accomplished with resistance welding.

26. A method according to claim 22, wherein said treating step is accomplished with induction welding.

27. A method according to claim 22, wherein said filler agent is a brass strip coated with flux.

28. A method according to claim 1, further comprising:

C6. machining said stressed tube such that said stressed tube cross-section corresponds to the cross section of each of said finished individual stressed shape piston rings.

29. A method according to claim 28, wherein said machining step comprises turning said stressed tube such that said stressed tube has a substantially circular cross-section after machining.

30. A method according to claim 3, further comprising:

C6. machining said stressed tube such that said stressed tube cross-section corresponds to the cross section of each of said finished individual stressed shape piston rings.

31. A method according to claim 1, wherein said stressed tube has a substantially elliptical cross-section.

32. A method according to claim 1, wherein said tube blank has an elliptical cross-section.

33. A method according to claim 1, wherein said releasing step is accomplished with an oxy-acetylene torch.

34. A method according to claim 1, wherein said releasing step is accomplished with a carbide cutter.

35. A method according to claim 1, wherein said releasing step is accomplished with a grinding wheel.

36. A method according to claim 1, wherein said tube blank comprises a centrifugally cast iron tube.

* * * * *